United States Patent [19]

Ennenga et al.

[11] Patent Number: 5,107,117

[45] Date of Patent: Apr. 21, 1992

[54] OPTOELECTRONIC VIEWING SYSTEM

[75] Inventors: Luitjen Ennenga, Hude; Norbert Schulz, Achim-Uphusen; Walter Weiland, Bremen; Hans Stana, Oberkochem; Wold Teuchert, Konigsbronn, all of Fed. Rep. of Germany

[73] Assignees: Krupp Atlas Elektronik GmbH, Bremen; Carl Zeiss, Oberkochen, both of Fed. Rep. of Germany

[21] Appl. No.: 534,265

[22] Filed: Jun. 7, 1990

[30] Foreign Application Priority Data

Jun. 13, 1989 [DE] Fed. Rep. of Germany ....... 3919265

[51] Int. Cl.$^5$ .................... G02B 23/02; G02B /26/10; G02B 26/04
[52] U.S. Cl. ............................. 250/334; 250/342; 250/347; 250/348; 250/353; 250/351
[58] Field of Search ............... 250/334, 345, 342, 347, 250/348, 351, 353, 349, 350; 358/93, 231, 87

[56] References Cited

U.S. PATENT DOCUMENTS

| | | | |
|---|---|---|---|
| 3,088,033 | 4/1963 | Kaufold | 250/332 X |
| 3,219,822 | 11/1965 | Kutzscher et al. | 250/347 |
| 3,622,788 | 11/1971 | Briggs | 250/347 |
| 3,626,091 | 12/1971 | Casper . | |
| 4,199,785 | 4/1980 | McCullough et al. | 250/333 X |
| 4,574,197 | 3/1986 | Kliever | 250/334 |
| 4,672,435 | 6/1987 | Glück | 358/87 |
| 4,724,482 | 2/1988 | Duvent | 250/334 X |
| 4,797,942 | 1/1989 | Burt | 358/87 |
| 4,806,761 | 2/1989 | Carson et al. | 250/332 |
| 4,912,321 | 3/1990 | Cooper | 250/334 X |
| 4,952,809 | 8/1990 | McEwen | 250/342 |
| 4,991,020 | 2/1991 | Zwirn | 250/334 X |

FOREIGN PATENT DOCUMENTS

WO86/03916 7/1986 European Pat. Off. .

*Primary Examiner*—Constantine Hannaher
*Assistant Examiner*—Edward J. Glick
*Attorney, Agent, or Firm*—Spencer & Frank

[57] ABSTRACT

An optoelectronic viewing system for imaging a field of view on a monitor includes a telescope for generating an optical image of the field of view, a scanning device for electronically scanning the optical image and an electronic evaluation unit for processing the scanning signals and displaying the image on the monitor. In order to create a field of view which is large enough for surveillance with a long-range viewing system that has sufficient resolution, a mirror system for pivoting the direction of beam incidence in the vertical and horizontal direction is placed ahead of the telescope. The mirror system is driven for reproducibly and consecutively passing through a succession of fixed predetermined pivoted positions. The scanned image signals obtained from the individual pivoted positions are combined into a field of view. In one embodiment, a small field of view contained within the large field of view, which can be positioned as desired within the large field of view and which is generated by a second telescope utilizing the same image scanning device and the same evaluation unit, can be displayed in parallel thereto.

10 Claims, 3 Drawing Sheets

OPTOELECTRONIC VIEWING SYSTEM

CROSS REFERENCE TO RELATED APPLICATION

This application claims the priority of application Ser. No. P 39 19 265.2, filed Jun. 13, 1989, in the Federal Republic of Germany, the subject matter of which is incorporated herein by reference.

BACKGROUND OF THE INVENTION

The present invention relates to an optoelectronic viewing system for imaging a field of view on a monitor, and more particularly to an optoelectronic viewing system of the type including a telescope for generating an optical image of the field of view, an image scanning device for repeated electronic scanning of the optical image, and an electronic evaluation unit for processing the scanned signals and displaying the image on the monitor.

Image scanning devices employed in these optoelectronic viewing systems, such as a thermal imaging or CCD (charge coupled device) camera, have a predetermined radiation receiving or detector surface to which the format of the image of a field of view produced by a telescope must be adapted. The number of detector elements forming the detector surface determines the quality of the image resolution. This image format and the focal length of the telescope determine its viewing angle. Viewing modules for military vehicles require long ranges with sufficiently high detail. Thus, the telescopes employed in such an application require long focal lengths which, of necessity, results in a great reduction of the viewing angle and thus of the field of view. Because of the small size relative to the overall scene of interest, the field of view that can be covered by the telescope is then no longer suitable for surveillance purposes, particularly not for the surveillance of fast flying objects which may have already left such a small field of view before they can be detected.

SUMMARY OF THE INVENTION

It is an object of the present invention to provide an optoelectronic viewing system for very long ranges which, with sufficient image resolution, furnishes a field of view that is sufficiently large for visual surveillance.

The above and other objects are accomplished in accordance with the invention by the provision of an optoelectronic viewing system for imaging a field of view on a monitor, including: a telescope for magnifying an optical image projected along a beam path and within a field of view of the telescope; scanning means receiving the optical image from the telescope and repeatedly electronically scanning the optical image for producing scanning signals representing the optical image; electronic evaluation means connected to the scanning means for processing the scanning signals; a monitor connected to the electronic evaluation means and receiving the processed scanning signals for displaying the image; pivotal mirror means positioned ahead of the telescope in the direction of beam incidence along the beam path for pivoting the direction of incidence of the beam relative to the telescope in the vertical and horizontal directions; drive means connected to the pivotal mirror means for reproducibly pivoting the mirror means into defined pivoted positions in which the direction of beam incidence has a fixed predetermined deflection in the vertical and horizontal directions; and control means connected to the drive means for controlling the drive means so that the mirror means successively assumes all pivoted positions for a predetermined period of time and in a predetermined sequence.

In the optoelectronic viewing system according to the invention, the field of view for a region under surveillance is composed, in the shortest possible time, of a plurality of individual regions or segments whose dimensions are predetermined on the basis of the required range and detail resolution of the telescope. The mirror system preceding the telescope in the direction of light incidence is able to be pivoted into a plurality of positions, each enabling the telescope to cover one segment and image it on the detector surface of the image scanning device. The mirror system successively traverses the pivoted positions in a reproducible manner and in a predetermined sequence. The image of the field of view ultimately appearing on the monitor is thus composed of the plurality of segments lying horizontally next to one another and vertically above one another in the surveillance region as covered and scanned in timely succession by the telescope.

Because the segments within the field of view are relatively small for optical reasons, as previously explained, the mirror surfaces of the mirror system also may be small. The mirror system which, according to a preferred embodiment of the invention, may advisably be composed of two mirrors lying behind one another in the beam path and driven to rotate about orthogonal pivot axes, thus is able to operate with relatively small pivotal mirrors which are low in mass, and thus in inertia, and can be moved and stopped again quickly. The speed of the mirror setting process is significantly increased by the fact that the two mirrors are moved suddenly and possibly simultaneously into a fixed predetermined position and, when stopped there, are arrested. The adjustment period required for bringing the pivotal mirrors from the one position into the next position is much shorter in comparison with a continuous adjustment of the mirrors until they reach their final position and stopping the drive when they reach the end position. Due to the low inertial masses involved, the mirrors, when stopped in the new position, oscillate only briefly and quickly come to rest.

In the viewing system according to the invention, switching times of less than 26 ms can be realized for the pivotal mirrors. If one uses a pure scanning time of 14 ms per image as the basis for the prior art thermal imaging devices, the coverage of one segment of the field of view requires less than 40 ms. A field of view composed, for example, of six segments (two horizontally juxtaposed rows of three vertically superposed segments each), is thus repeatedly scanned, that is, brought up to date, in less than 240 ms. Depending on the desired refreshment rate for the field of view, this field may be composed of a greater or smaller number of segments.

Advantageous embodiments of the viewing module according to the invention with advisable modifications and features of the invention are further defined below and in the detailed description.

For bidirectional image scanners or unidirectional image scanners having extremely short scanner resetting periods there exist no sufficiently long dead times which can be utilized for the pivoting of the mirrors. In these cases, a preferred embodiment of the invention provides that the control unit synchronizes the mirror drive for the pivotal mirror system with the image scanning device in such a way that the mirror system has taken up its respective next pivoted position at the beginning of every other scanning period and retains this position during the actual scanning phase (for unidirectional image scanning devices this is the scanning period without the resetting time) and the next scanning period is utilized to pivot the mirrors. Correspondingly, the control unit synchronizes the electronic evaluation system for processing the scanned signals and displaying the image of the field of view on the monitor with the image scanning device so that only the scanned signals from every other scanning period are utilized for processing to generate the image. In this method, a 50 Hz scanning frequency customary for image scanners is reduced to 25 Hz which, however, does not adversely affect the quality of the image displayed on the monitor.

According to another preferred embodiment of the invention, the quasi dead times thus created for the image scanner during pivoting of the mirrors are utilized to generate an image for a second optical viewing channel to thus be able to produce a further field of view simultaneously on the same or a separate monitor. For this purpose, a second telescope is employed together with an optical coupling member which, during the scanning period of the image scanning device in which the mirrors are changed, produces the image generated by the second telescope on the detector surface of the image scanner so that the latter will be able to scan it. Thus, in successive scanning periods of the image scanner, the scanner alternatingly scans an image generated by the first telescope and one generated by the second telescope.

If, according to a further embodiment of the invention, the second telescope is preceded in the direction of beam incidence by a mirror system which, preferrably, is also composed of two pivotal mirrors placed one behind the other in the beam path and pivotal about mutually orthogonal axes, appropriate setting of the mirrors enables the field of view to be set at any position in space.

Advisably, according to a further embodiment of the invention, the two beam paths or optical channels of the two telescopes are conducted over a main mirror so that both telescopes are oriented in the same direction. In this case, the second telescope produces a section of the field of view within the field of view imaged on the monitor by the first telescope. This section can be placed at any position within the field of view by means of the mirror system preceding the telescope. If the drive motors for the second mirror system are connected to a target tracking device, the viewing field section follows the movement of a selected target within the field of view.

The invention will now be described in greater detail with reference to an embodiment illustrated in the drawing figures.

DETAILED DESCRIPTION OF THE PREFERRED EMBODIMENT

Figure 1:
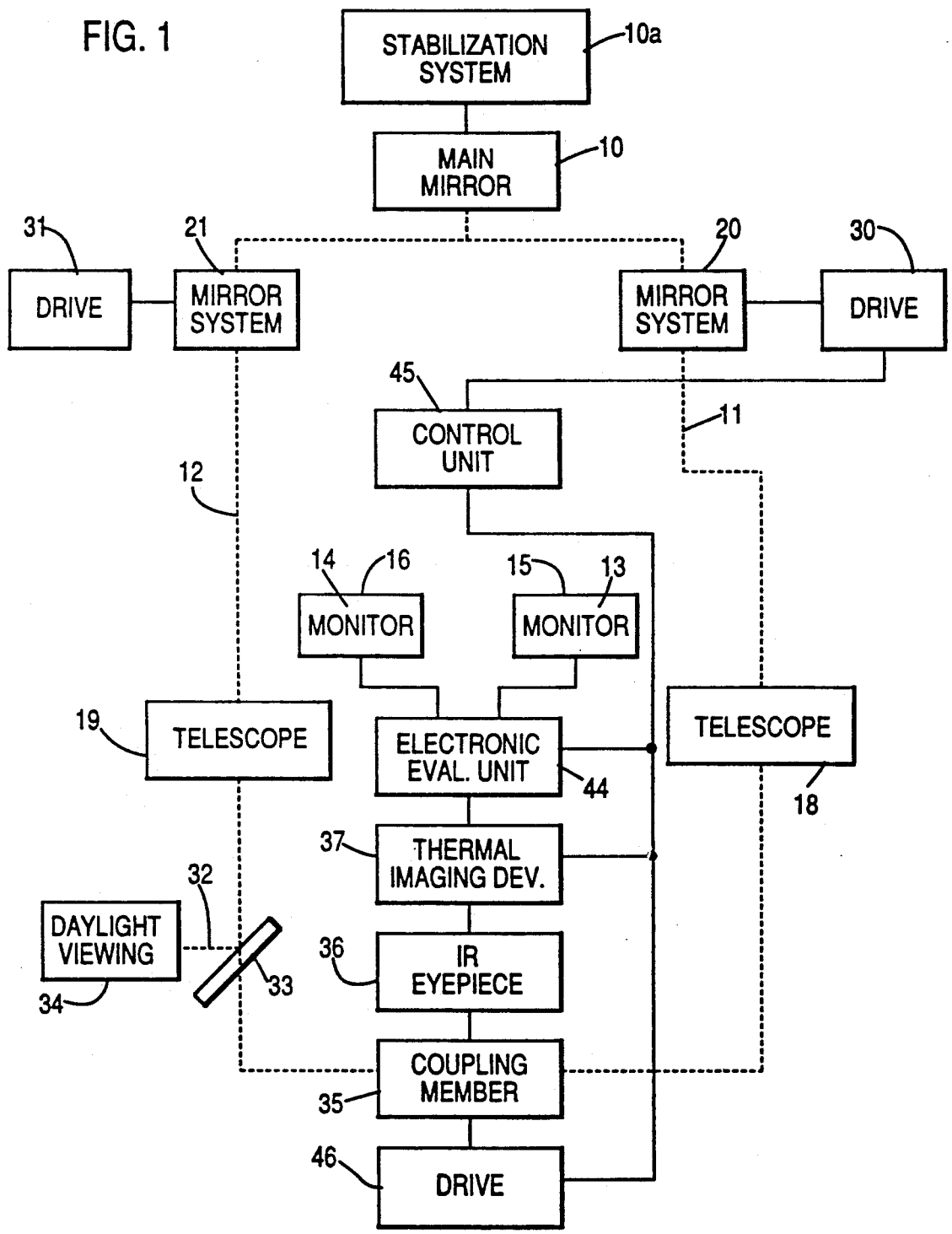
FIG. 1 is a block circuit diagram of an optoelectronic viewing system according to one embodiment of the invention.
Figure 5:
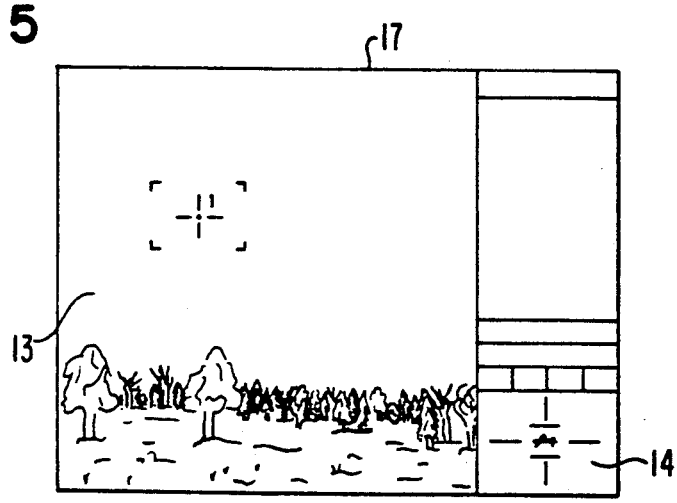
FIG. 5 is a schematic representation of the screen of a monitor showing two fields of view displayed simultaneously by means of the viewing system of FIG. 1.

Referring to FIG. 1, there is shown an optoelectronic viewing system according to the invention which includes two optical beam paths or optical channels 11 and 12 shown in dashed lines. At their inputs, optical channels 11 and 12 are brought together by way of a main mirror 10, also called the viewing mirror, so that the same viewing direction, indicated by the position of main mirror 10, applies for each optical channel. Main mirror 10 is preferably mounted by way of a stabilization system 10a including gimbals, associated drive motors, angle sensors, a biaxially sensing gyro and an electronic drive system (none of which is shown in detail) for stabilizing main mirror 10 in space in a manner understood by those skilled in the art. By way of the two optical channels 11 and 12, two separate fields of view 13 and 14 can be displayed on separate monitors 15 and 16 or, as shown in FIG. 5, on a common monitor 17. Both fields of view 13 and 14 lie within the directional range of stabilized main mirror 10.

Figure 2:
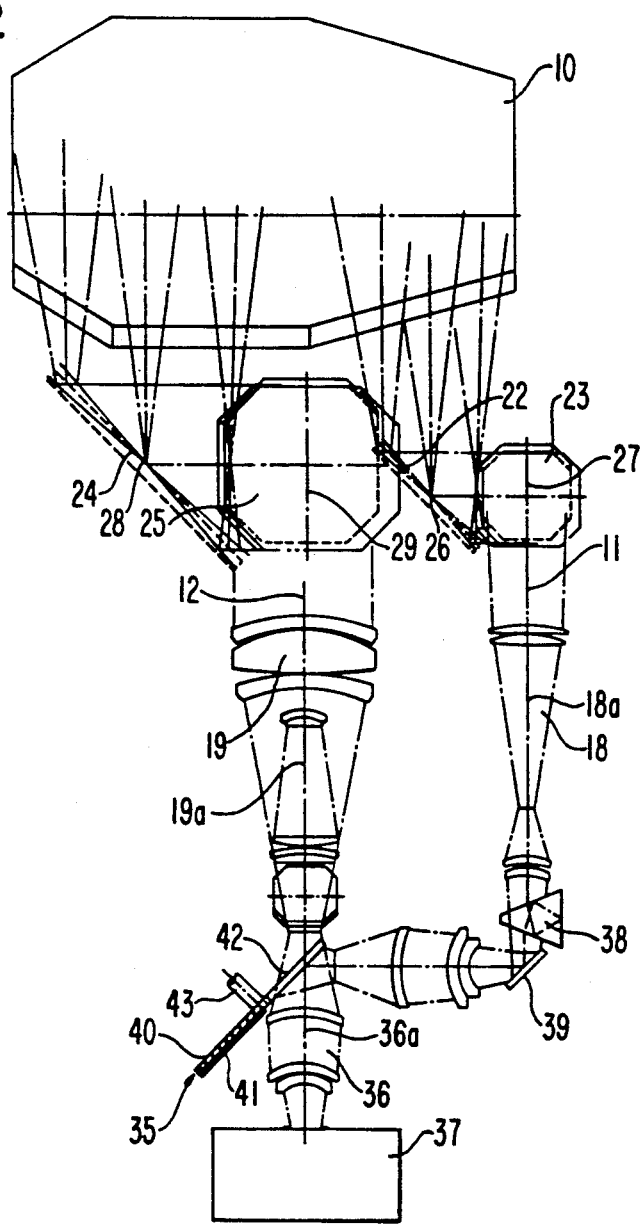
FIG. 2 is a side view, in partial section, of the optical portion of the viewing system of FIG. 1.

Referring additionally to FIG. 2, each optical channel 11 and 12 includes a lens or telescope 18 and 19, respectively, and a mirror system 20 and 21, respectively, associated with telescopes 18 and 19, respectively, in the direction of light incidence. Each mirror system 20 and 21 is composed of two pivotal mirrors 22, 23 and 24, 25, respectively, which are arranged one behind the other in the respective optical beam paths and are pivotal about orthogonal pivot axes 26, 27 and 28, 29, respectively. To drive pivotal mirrors 22, 23 and 24, 25, respectively, each mirror system 20 and 21 has an associated driving device 30 and 31, respectively, each of which is provided with two separate setting motors for their two pivotal mirrors 22, 23 and 24, 25, respectively (not shown).

Telescope 18 is configured as an infrared (IR) lens while telescope 19 is a broadband lens since a daylight viewing channel 32 also passes through it so as to couple a daylight viewing lens 34 into optical channel 12 by means of a semi-transparent divider mirror 33. If daylight viewing channel 32 is not provided, telescope 19 is preferably also configured as an IR lens. Telescope 18 has a small magnification with a large field of view while telescope 19 has a large magnification with a small field of view.

By means of an optical coupling member 35 and an IR eyepiece 36, both optical channels 11 and 12 are brought to a thermal imaging device 37. As can be seen in FIG. 2, the optical axis 36a of IR eyepiece 36 is flush with the beam path 19a of second telescope 19, while the beam path 18a in the first telescope 18, which is parallel to beam path 19a in second telescope 19, passes through an uprighting lens 38 and a deflector mirror 39 and extends at approximately a right angle to the optical axis of IR eyepiece 36.

Optical coupling member 35 is configured as a continuously driven chopper wheel 40 which includes a mirror surface 41 that extends over 180° in the direction of rotation and a beam passage opening 42 which extends over the remaining 180°. The rotation axis 43 of the chopper wheel is oriented at an acute angle to the optical axis of IR eyepiece 36 and is arranged so that, during rotation of chopper wheel 40, mirror surface 41 and beam passage opening 42 successively pass through the beam path between second telescope 19 and thermal imaging device 37. As long as beam passage opening 42 remains in the beam path of telescope 19, the image generated by telescope 19 is reproduced on the detector surface (not shown here) of thermal imaging device 37. If mirror surface 41 enters into the beam path of telescope 19, the beam path between second telescope 19 and IR eyepiece 36 is interrupted and the beam path of first telescope 18 is deflected toward IR eyepiece 36. Thus, the righted image generated by first telescope 18 is reproduced on the detector surface of thermal imaging device 37. During one full revolution of chopper wheel 40, one image generated by first telescope 18 and one image generated by second telescope 19 reach thermal imaging device 37.

Figure 4:
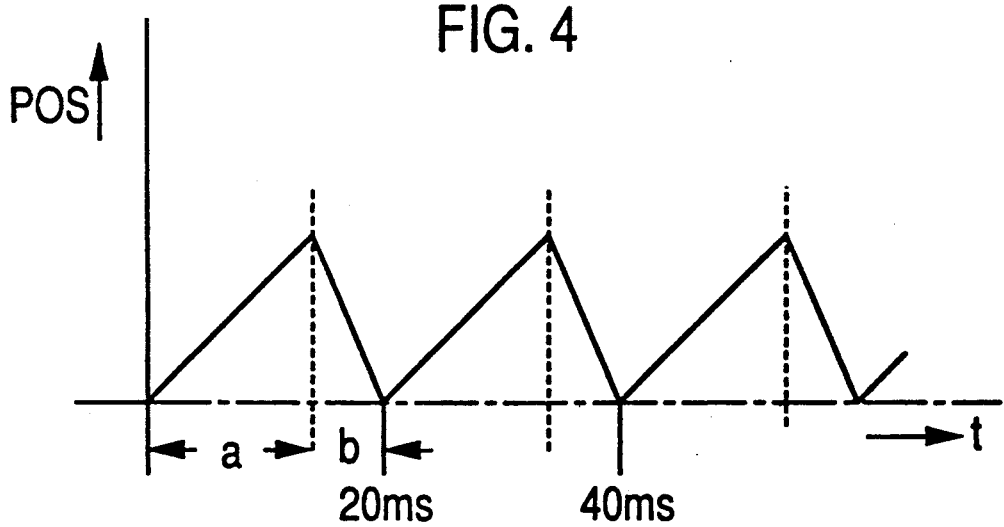
FIG. 4 is a diagram to explain the scanning process of an image scanner in the viewing system of FIG. 1.

Thermal imaging device 37 is a known component and includes an IR sensitive detector surface in the form of a detector array composed of a multitude of individual elements and a scanner which respectively scans in a known manner the images generated by telescopes 18 and 19 horizontally across the detector array. During this sampling or scanning process, each individual element of the detector array is read out repeatedly and the resulting electrical signals, the so-called scanning signals, are fed to an electronic evaluation unit 44. The scanner operates unidirectionally, i.e. it always scans the image in the same direction and at the end of scanning moves back quickly. The position of the scanner relative to the image to be scanned is shown in an idealized manner in FIG. 4 as a function of time. With a scanning frequency of 50 Hz, the image is initially scanned for a period of 14 ms (scanning phase a), whereupon during the next 6 ms, the scanner returns to its starting position (return phase b), from where the next scanning period of a total of 20 ms begins anew with another scanning phase a followed by a return phase b. The individual scanned signals are stored and processed in electronic evaluation unit 44 in a known manner to produce an image on monitors 15 and 16. The display on monitors 15 and 16 is made according to the applicable television standard.

Driving device 31 for mirror system 21 is configured so that the two pivotal mirrors 24 and 25 are pivoted steadily, enabling the field of view of telescope 19 to be moved continuously within the directional range of main mirror 10. If, for example, driving device 31 is connected to a target tracking device in a manner understood by those skilled in the art, the field of view of telescope 19 follows the movement of a selected target which, in view of the magnification of telescope 19, is displayed on monitor 16 (FIG. 1) or on monitor 17 (FIG. 5) at 14 as if viewed through a magnifying glass.

However, driving system 30 for mirror system 20 is configured so that the two pivotal mirrors 22 and 23 are moved until they stop in defined pivoted positions. In each pivoted position of the two pivotal mirrors 22 and 23, the direction of beam incidence for mirror system 20 has a fixed predetermined deflection angle relative to the optical axis of telescope 18 so that the field of view of telescope 18 is shifted vertically and horizontally in space by defined steps.

A control unit 45 controls driving device 30 so that mirror system 20 takes on its individual pivoted positions successively and in a predetermined sequence and remains in each pivoted position for a predetermined period of time. The pivoted positions of mirror system 20 are fixed and predetermined by a raster and can be reproducibly approached by driving device 30. The displacement of the field of view of telescope 18 in the various pivoted positions of mirror system 20 is shown schematically in FIG. 3. The numeral I here identifies the position of the field of view of telescope 18 in the first pivoted position of mirror system 20, the numeral II identifies the second pivoted position, etc. Beginning with the first set position I, pivotal mirrors 22 and 23 of mirror system 20 are pivoted about their respective axes in defined steps, that is, vertical mirror 22 from position I to position II, horizontal mirror 23 from position II to position III, again vertical mirror 22 from position III to position IV and from position IV to position V, again horizontal mirror 23 from position V to position VI, and again vertical mirror 22 from position VI to position I.

Control unit 45, which may be implemented by way of a microprocessor in a manner familiar to those skilled in the art, synchronizes driving device 30 for mirror system 20 and a driving device 46 for chopper wheel 40 as well as electronic evaluation unit 44 with thermal imaging device 37. The synchronization of driving device 30 is such that mirror system 20 has taken up the next pivoted position at the beginning of every second scanning period on the part of the scanner of thermal imaging device 37, that is every 40 ms in FIG. 4, and remains in this pivoted position at least during the next scanning period of 14 ms. Driving device 46 for chopper wheel 40 is synchronized so that chopper wheel 40 performs one complete revolution over two successive scanning periods so that optical channel 11 and optical channel 12 each become visible once for thermal imaging device 37 during successive scanning periods. Electronic evaluation unit 44 is synchronized by control unit 45 so that the scanning signals picked up from successive scanning periods are stored in separate memories and are processed into two separate images.

Figure 3:
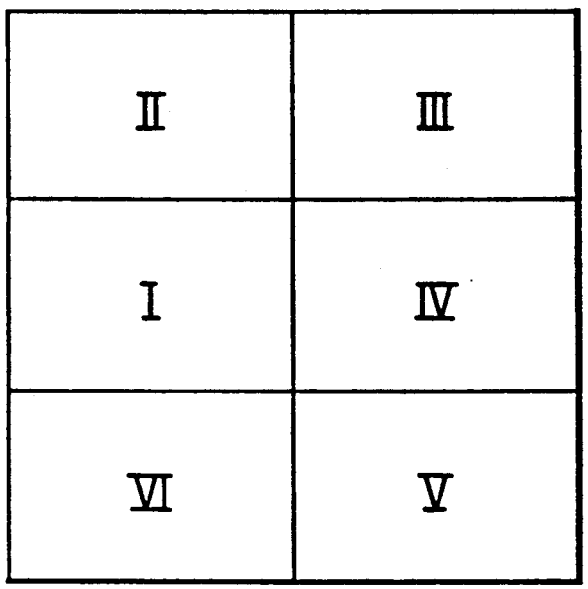
FIG. 3 is a schematic representation of the field of view of the viewing system according to the invention.

As can be seen in FIG. 5, a large field of view 13 appears on monitor 17 showing the surveillance area with a resolution which, if only telescope 18 were used, could be realized only by limiting the field to the smaller area of a segment I to VI shown in FIG. 3. In other words, monitor 17 shows a field of view which is six times as large as that furnished by telescope 18 with the desired resolution. Since the image generated by telescope 18 is scanned during every other scanning period, twelve scanning periods by the scanner are required to completely reproduce field of view 13 which, with a scanning frequency of 50 Hz, corresponds to the field of view being refreshed every 240 ms. In parallel thereto, the second field of view 14 may be displayed continuously with a freely selectable enlargement of a section of the field of view furnished by optical channel 12.

The present invention is not limited to the described embodiment. For example, instead of the thermal imaging device, a CCD camera or some other electronic image scanning device may be employed. Additionally, more than two optical channels may be utilized in the described manner together with a single image scanning device in order to display separate images.

Obviously, numerous and additional modifications and variations of the present invention are possible in light of the above teachings. It is therefore to be understood that within the scope of the appended claims, the invention may be practiced otherwise than as specifically claimed.

What is claimed is:

1. An optoelectronic viewing system for imaging a field of view on a monitor, comprising:
   a telescope for magnifying an optical image projected along a beam path and within a field of view of said telescope;
   scanning means receiving the optical image from said telescope and repeatedly electronically scanning the optical image for producing scanning signals representing the optical image;
   electronic evaluation means connected to said scanning means for processing the scanning signals;
   a monitor connected to said electronic evaluation means and receiving the processed scanning signals for displaying the image;
   pivotal mirror means positioned ahead of said telescope in the direction of beam incidence along the beam path for pivoting the direction of incidence of the beam relative to said telescope in the vertical and horizontal directions;
   drive means connected to said pivotal mirror means for reproducibly pivoting said pivotal mirror means into defined pivoted positions in which the direction of beam incidence has a fixed predetermined deflection in the vertical and horizontal directions so that said telescope generates an optical image segment for each defined pivoted position of said mirror means; and
   control means connected to said drive means for controlling said drive means so that said mirror means successively assumes each pivoted position for a predetermined period of time and in a predetermined sequence, wherein the scanning signals representing respective image segments generated by said telescope are processed by said electronic evaluation means so that the image of the field of view displayed on said monitor is composed of a plurality of image segments juxtaposed in correspondence with the predetermined sequence.

2. An optoelectronic viewing system as defined in claim 1, wherein:
   said scanning means has a periodic scanning sequence;
   said control means synchronizes said drive means with said scanning means so that said mirror means assumes the next pivoted position at the beginning of every second scanning period of said scanning means and remains in that position during at least one scanning period; and
   said control means synchronizes said electronic evaluation means with said scanning means so that only the scanning signals from every second scanning period in which said mirror means is in a predetermined pivoted position are utilized to display the image.

3. An optoelectronic viewing system as defined in claim 2, and further comprising:
   a second telescope for magnifying an optical image projected along a beam path of a second field of view;
   optical coupling means disposed in the optical beam path between said first telescope and said scanning means and between said second telescope and said scanning means for alternatingly transmitting the optical images produced by said first telescope and by said second telescope to said scanning means; and
   wherein said control means synchronizes said coupling means with said scanning means so that during successive scanning periods the images from said first and second telescope are each alternatingly scanned completely and synchronizes said evaluation means with said scanning means so that scanning signals obtained in successive scanning periods are processed separately into separate images.

4. An optoelectronic viewing system as defined in claim 3, and further comprising:
   optical deflection means positioned in the beam path of said second telescope for deflecting the beam from said second telescope toward said optical coupling means; and
   wherein said optical coupling device comprises a rotatable chopper wheel and a chopper wheel drive means for continuously rotatably driving said chopper wheel, said chopper wheel including a mirror surface that extends over 180° in the direction of rotation of said chopper wheel and a beam passage opening that extends over the remaining 180° of said chopper wheel, said chopper wheel being arranged so that its axis of rotation is oriented at an acute angle to the beam path between said first telescope and said scanning means so that said mirror surface and said beam passage opening successively pass through the beam path exiting from said first telescope, the beam path exiting at said second telescope being guided by way of said optical deflection means so that it can be deflected by the mirror surface of said chopper wheel onto said scanning means, and said control unit synchronizing said chopper wheel drive means and said scanning means so that said chopper wheel performs a full revolution during two successive scanning periods of said scanning means.

5. An optoelectronic viewing system as defined in claim 3, and further comprising: a second mirror means disposed ahead of said second telescope in the direction of beam incidence along the beam path of said second telescope for pivoting the direction of beam incidence on said second telescope in the vertical and horizontal directions; and second drive means for continuously pivoting said second mirror means.

6. An optoelectronic viewing system as defined in claim 5, and further comprising a common main mirror means for directing light to each of said first and second mirror means each of which guide the respective beam paths for the first and second telescopes.

7. An optoelectronic viewing system as defined in claim 6, and further comprising stabilization means connected for to said common main mirror means for stabilizing said common main mirror means in space.

8. An optoelectronic viewing system as defined in claim 5, wherein each of said first and second mirror means includes a vertical mirror pivotal about a horizontal axis and a horizontal mirror pivotal about a vertical axis with one of said mirrors arranged behind the other of said mirrors in the respective optical beam paths of said first and second telescopes, and said first and second drive means each include separate setting motors for pivoting said vertical and horizontal mirrors, respectively.

9. An optoelectronic viewing system as defined in claim 1, wherein said scanning means comprises a thermal imaging camera.

10. An optoelectronic viewing system as defined in claim 1, wherein said scanning means comprises a camera employing a charge coupled device.

* * * * *